United States Patent Office 3,118,912
Patented Jan. 21, 1964

3,118,912
PREPARATION OF HYDROXYMETHYLFURFURAL
Norman H. Smith, Shelton, Wash., assignor to Rayonier, Incorporated, Shelton, Wash., a corporation of Delaware
No Drawing. Filed Apr. 18, 1960, Ser. No. 22,677
7 Claims. (Cl. 260—347.8)

This invention relates to the manufacture of hydroxymethylfurfural from hexose sugars. More specifically, the invention provides a process for converting simple hexose sugars into hydroxymethylfurfural by means of a controlled heat treatment in the presence of a catalyst containing both ammonium and sulfate or sulfite ions.

The invention is based on the discovery that by heating an aqueous solution of a simple monomeric or dimeric hexose sugar for relatively short periods of time under carefully controlled but relatively mild conditions of temperature and pressure, and in the presence of at least one percent of a catalyst containing both ammonium and sulfate or sulfite ions, that hydroxymethylfurfural can be produced in high yield. The improved process is effective for the production of hydroxymethylfurfural from any type of simple monomeric or dimeric hexose sugar, whether aldosic or ketosic in form, without the use of expensive Amadori or cumbersome and time-consuming alkaline conversion steps or the use of extremely high pressures and temperatures. The invention is advantageously adaptable to the conversion of the sugars present in spent sulfite pulping liquors to hydroxymethylfurfural, for in this material it utilizes both the sugar and the ammonium sulfite.

Although hydroxymethylfurfural (hereinafter designated as HMF, for convenience) has considerable potential utility in plastics, resins, adhesives, pharmaceuticals and the like applications, its relatively high cost has so far prevented its commercial adaptation to those usages in important quantities. As a compound, HMF was apparently first prepared in 1885 by a process comprising the heat treatment of a ketose sugar (fructose) at a temperature of 120° C. in the presence of 0.3% of oxalic acid as a catalyst. Improvements in this method were gradually developed which included variations in the temperature, pressure and catalyst used, along with improved methods of recovering the HMF as produced. As a chemical, HMF is an active compound that tends to react readily with many other compounds, and because of its relative instability may undergo self-decomposition when subjected to high temperatures and other severe reaction conditions. For these reasons, the processes proposed heretofore have not been successful because of poor yields. Also, costly and complex equipment capable of withstanding the wide and very rapid fluctuations in temperature and pressure, as well as the corrosive action of the acid catalysts, was necessary.

Although much research has been done in this field and there are many kinds of waste sugars available for use, there is no known commercial operation now utilizing these sugars for the production of HMF. For example, there are enormous amounts of aldosic hexoses present as substantial components of various vegetable products, such as spent sulfite pulping liquors, sawdust and molasses, and the like, now being wasted.

In the process of the invention, any simple hexose sugar such as glucose, mannose, sucrose or fructose can be readily and easily converted into HMF in good yield. The hexose should be in aqueous solution and, although the concentration is not critical, for practical reasons the total solids in said solution should amount to at least 30%. Too dilute starting solutions, of course, yield dilute product solutions from which it is correspondingly difficult to separate the product. At the other extreme, the concentration should be limited to such a level as not to interfere with easy manipulation during processing. The optimum concentration in each case will be found to depend, to a large extent, upon the composition of the starting material and the concentration of catalyst present.

From 1 to 6% of a catalyst containing both ammonium and sulfate or sulfite ions should be present in the foregoing solution at the time of its heat treatment. The preferred salts for catalysts are ammonium sulfate or ammonium sulfite, but most combinations of salts that will yield ammonium and sulfate or sulfite ions simultaneously are satisfactory. Many salts have some effect, but I have discovered that the simultaneous presence of the foregoing ions in the indicated concentrations during the conversion of the hexose to HMF has an unexpected synergistic effect. The mechanism of this synergistic effect is not known. Both ammonium and sulfate or sulfite ions by themselves have some beneficial effect, but an equal quantity of a mixture of the same ions will be more than twice as effective. Spent ammonia-base sulfite pulping liquors will be found to contain sufficient of the foregoing ions that the addition of further catalyst may not be required.

To convert the hexoses into HMF in optimum yields, the aqueous solution of hexoses and catalyst is rapidly heated to between 145 and 200° C. and maintained at this temperature for from 200 to 5 minutes. In general, the shorter times should be coupled with the higher temperatures and vice versa. Experiments have shown, for example, that the following combinations will give excellent results and approximately equivalent yields, other processing conditions remaining equal; 6 minutes at 195 to 200° C., 20 minutes at 175–180° C., 90 minutes at 155–160° C., and 200 minutes at 145–150° C. HMF being a very reactive compound, over-treatment in the cooking stage must be avoided to prevent excessive loss in product by side reactions and decomposition. This is particularly true when using spent sulfite pulping liquor solids, since HMF readily condenses with the ligneous materials contained therein under severe processing conditions. After formation, the HMF containing solution is quickly cooled and the HMF removed by known methods. The conversion from hexose sugar to HMF by the method of this invention proceeds smoothly and is accompanied by the formation of an insoluble granular solid product containing chemically-bound nitrogen. This latter solid product is easily filtered out and discarded, to leave a crude liquor that will contain up to about 6% of HMF. The filtered product solution can then be concentrated under vacuum and the HMF removed by extraction with ethyl acetate, etc., or by other more or less conventional methods. Yields of up to about 30% of theoretical are easily obtained, based on the weight of the original hexose.

An unusual feature of the present process is the relatively wide range of pH's at which the heat treatment is effective. In the practices heretofore suggested, it has been necessary to confine the reaction to the strongly acid side by the use of strong acid catalysts. In my process, the starting pH can range anywhere between about 1.5 and 10.0, and although the pH will drop during the reaction, it is entirely feasible to end the reaction with a final pH as high as 3.5 to 5.0. The use of the more nearly neutral solutions, of course, has many advantages as far as processing equipment is concerned.

The following examples illustrate the application of the process of the invention to the conversion of simple hexose sugar-containing materials to HMF.

EXAMPLE I

This example illustrates the preparation of HMF from a spent ammonia-base sulfite pulping liquor.

A solution of spent ammonia-base sulfite pulping liquor was concentrated under a moderate vacuum to a total solids content of 40.3%. Analysis of the concentrated liquor indicated that it contained 19.9% of simple hexose sugars based on the weight of the total solids present, distributed as follows: 14.4% mannose, 2.8% glucose and 2.7% galactose. Catalyst equivalent to 1% ammonium sulfite based on the weight of the solution was present, and the pH was 5.6.

A sample of the foregoing solution was heated in a glass ampule at 160 to 160° C. for 60 minutes and then quickly cooled to room temperature. The product, which was a viscous syrup, was then analyzed by the aniline-acetate colorimetric method and found to contain, among other things, 3.8% HMF (based on the weight of the total solids originally present) which corresponds to 27.5% of theoretical yield based on the free sugars present in the spent liquor.

EXAMPLE II

This example illustrates a process for the preparation of HMF from a sugar-catalyst solution.

8 liters of solution were prepared by dissolving 1800 grams of corn sugar (Dextrose) and 660 grams of ammonium sulfate in sufficient water. This solution was then placed in a tantalum-lined rotating autoclave and heated at 155 to 160° C. for 100 minutes, after which it was quickly cooled and removed. The product solution contained HMF and other solubles, plus 650 grams (dry basis) of an insoluble residue. Colorimetric analysis of the solution by the aniline-acetate method indicated an overall yield of 185 grams of HMF, equivalent to 14.7% of the theoretical maximum based on the weight of the corn sugar used. Continuous countercurrent extraction of the product solution with ethyl acetate, followed by removal of the ethyl acetate by evaporation, yielded 275 grams of a viscous oil containing 184 grams of HMF. Nitrogen analyses of the aqueous product and insoluble residue showed that it contained about 5% nitrogen in a fixed form. The overall nitrogen consumption (conversion to combined nitrogen) was 44%, or 0.4 gram of $NH_3$ consumed for each gram of HMF produced.

EXAMPLE III

This example illustrates the unexpected synergistic effect obtained by the use of a catalyst containing both ammonium and sulfate ions.

A 13.3% solution of corn sugar (Dextrose) was prepared, and aliquots of the same were diluted with various salt solutions to provide starting liquors that were 10.0% by weight with regard to the sugar, 0.56 molar with regard to the cation present, and had a uniform pH of 2.3. 4.0 ml. portions of these mixtures were then placed in glass bombs and heated in an oil bath at 160–165° C. for 30 and 60 minutes intervals, after which they were quickly cooled and colorimetrically analyzed for HMF content by the aniline-acetate method. The results follow in Table I.

*Table I*

| Salt Added | Yield of HMF, Percent of Theoretical Maximum | |
|---|---|---|
| | 30 mins. at 160–165° C. | 60 mins. at 160–165° C. |
| None | 2.2 | 3.0 |
| NaCl | 1.8 | 3.95 |
| $Na_2SO_4$ | 5.15 | 9.9 |
| $NH_4Cl$ | 5.7 | 10.6 |
| $(NH_4)_2SO_4$ | 20.4 | 25.4 |

From the foregoing, it is apparent that the simultaneous presence of both the ammonium and sulfate ion in the catalysts more than doubled the yield over equal quantities of salts containing either ion alone. The following example will illustrate the same effect under somewhat different conditions.

EXAMPLE IV

A 24.0% aqueous glucose solution was prepared. Aliquots of the same were diluted with various ammoniacal salt solutions to provide starting liquors that contained 18% glucose by weight and were 1.0 normal with respect to said ammoniacal salt. 4.0 ml. portions of these liquors were then placed in glass bombs and heated in an oil bath to 175–180° C. for 20 minutes, after which they were quickly cooled and colorimetrically analyzed for HMF by the aniline-acetate method. The results follow in Table II.

*Table II*

| Salt Added | pH of Liquor at Start | HMF Yield, Percent of Theoretical |
|---|---|---|
| $(NH_4)_2CO_3$ | 8.9 | 5.3 |
| $(CH_3)_4NCl$ | 4.5 | 4.5 |
| $(NH_4)_2HPO_4$ | 8.4 | 9.0 |
| $NH_4SCN$ | 5.0 | 6.7 |
| $Et_2NH_2Cl$ | 9.8 | 9.8 |
| $(NH_4)_2S$ | 8.8 | 5.3 |
| $Et_3NHCl$ | 2.7 | 2.6 |
| $NH_4F.HF$ | 5.3 | 12.1 |
| $EtNH_3Cl$ | 5.7 | 14.3 |
| $(NH_4)_2SO_3$ | 7.1 | 21.8 |
| $(NH_4)_2SO_4$ | 5.4 | 22.5 |

The synergistic effect of the simultaneous presence of the ammonium and sulfate or sulfite ions, in the catalyst is evident in the preceding example.

EXAMPLE V

One unexpected improvement obtained by the present invention is its operability over a wide range of pH's in contrast to the very low level of pH previously considered necessary. The following example will illustrate the relatively wide range that can be used under suitable conditions. It will also illustrate the variations in yield that can be expected upon varying the time reaction under the specified conditions.

A solution containing 10% glucose and 3.7% ammonium sulfate was prepared. The pH of aliquotes of this solution were adjusted, as indicated in the following table, with $H_2SO_4$ and NaOH. 5 ml. samples of these aliquots were placed in glass bombs and heated in an oil bath at 150 to 155° C. for the indicated times. They were then quickly cooled and had their HMF content determined colorimetrically by the aniline-acetate method. The results follow in Table III:

*Table III*

| Time at 150–155° C. in minutes | pH of Solution at Start of Treat | Yield of HMF (Percent of Theoretical) |
|---|---|---|
| 50 | 1.65 | 31.5 |
| 100 | 1.65 | 27.8 |
| 200 | 1.65 | 27.6 |
| 50 | 3.15 | 19.3 |
| 100 | 3.15 | 26.8 |
| 200 | 3.15 | 27.6 |
| 50 | 5.75 | 15.0 |
| 100 | 5.75 | 24.8 |
| 200 | 5.75 | 23.6 |
| 50 | 7.6 | 14.8 |
| 100 | 7.6 | 25.7 |
| 200 | 7.6 | 25.3 |
| 50 | 9.9 | 6.8 |
| 100 | 9.9 | 12.8 |
| 200 | 9.9 | 21.2 |

I claim:

1. The improved process for the conversion of simple hexoses to hydroxymethylfurfural which comprises subjecting an aqueous solution of a hexose to a temperature of from about 145° C. to 200° C. in the presence of a catalyst consisting of ammonium ions and an ion of the group consisting of sulfate and sulfite and at a pH of from 1.5 to 10 until the hydroxymethylfurfural is produced in high yield.

2. In the process of claim 1, carrying out the process so that the pH at the end of the operation is from 3.5 to 5.0.

3. In the process of claim 1, carrying out the operation in the presence of about 1% to 6% by weight on the solution of a catalyst from the group consisting of ammonium sulfate and ammonium sulfite.

4. The process for the conversion of a hexose sugar of the group consisting of monomeric and dimeric hexose sugar to hydroxymethylfurfural which comprises subjecting an aqueous solution containing the hexose to a temperature of from about 145° C. to 200° C. for at least five minutes, at a pH of from 1.5 to 10 and in the presence in the solution of at least 1% by weight on the solution of ammonium cations and an anion of the group consisting of sulfate and sulfite.

5. The improved process for utilizing the chemicals contained in spent ammonia-base sulfite pulping liquors for the production of HMF which comprises concentrating the liquor to increase the simple hexose sugar content and heating the concentrated solution to a temperature of from about 145° C. to 200° C. for at least five minutes.

6. In the process of claim 5, carrying out the process with at least 1% by weight on the solution of ammonium sulfite present in the concentrated solution.

7. In the process of claim 5, concentrating the liquor to a total solids content of at least about 30% by weight.

References Cited in the file of this patent
UNITED STATES PATENTS 2,750,394    Peniston _____ June 12, 1956

FOREIGN PATENTS 422,330     Italy _____ June 13, 1947